United States Patent Office 3,427,173
Patented Feb. 11, 1969

3,427,173
CERAMIC DIELECTRICS
Shinobu Fujiwara, Minami-Akita-gun, Akita-ken, and Takao Shiraiwa, Akita-shi, Japan, assignors to TDK Electronics Co., Ltd., Tokyo, Japan
Filed June 8, 1964, Ser. No. 373,313
U.S. Cl. 106—39
Int. Cl. C04b 35/46
4 Claims

ABSTRACT OF THE DISCLOSURE

The present invention provides novel ceramic dielectric compositions consisting essentially of a sintered mixture of 45 to 95 molar percent barium titanate, 1 to 20 molar percent lanthanum titanium oxide $La_2O_3 \cdot 2TiO_2$ and 1 to 54 molar percent of calcium titanate. The ceramic dielectric compositions are produced by combining barium carbonate, calcium carbonate, lanthanum oxide and titanium oxide to form a homogeneous mixture. Such mixture is calcined in an oxidizing atmosphere at a temperature in the range of 1,100° C. to 1,300° C. for about two hours. The resultant mixture is pulverized into a fine powder followed by the addition of a binder which is admixed with the powder. The mixture is formed into the desired shape and size and the resultant shape is sintered in an oxidizing atmosphere at a temperature in the range of 1,100° to 1,400° C. for about three hours.

---

This invention relates to an improvement in ceramic dielectrics.

The object of this invention is to provide ceramic dielectrics which have much greater excellence in dielectric constant and Q-value than usual ones.

The ceramic dielectrics, which have been widely used, may be classified into two types: the one mainly comprises titanium oxide and the other mainly comprises barium titanate. Titanium oxide type dielectrics, which have been widely used as temperature compensator, have high Q-values ranging from 2000 to 3000 at high frequency, whereas their dielectric constants are small. For example, the dielectric constant of rutile ceramics which is regarded as a relatively highly practical type among the ceramics is only of the order of 114 or so.

On the other hand, barium titanate type ceramic dielectrics have large dielectric constants of more than 2000, and low Q-value of about 150 with extremely large temperature dependence and the minimum value of temperature coefficient of dielectric constant, at the present, is approximately $-6000 \times 10^{-6/°}$ C.

The characteristic feature of the present invention is a type of ceramic dielectrics whose characteristics lie between those of the two types mentioned above. It has larger dielectric constants than those of the titanium oxide type which have small dielectric constant, and much higher Q-values than those of barium titanate type which have large dielectric constant.

That is, this invention relates to a type of ceramic dielectrics whose main components are barium titanate ($BaTiO_3$), lanthanum titanium (IV) oxide ($La_2O_3 \cdot 2TiO_2$) and calcium titanate ($CaTiO_3$), and it has dielectric constants ranging from 250 to 3000 or so, Q-values ranging from 100 to 5500 and temperature coefficients of dielectric constants ranging from $-2100 \times 10^{-6/°}$ C. to $-9500 \times 10^{-6/°}$ C. or so.

The ceramic dielectrics in accordance with the present invention are produced by the following procedure: Stir barium carbonate ($BaCO_3$), calcium carbonate ($CaCO_3$), lanthanum (III) oxide ($La_2O_3$) and titanium (IV) oxide to be homogeneous mixture for about 20 hours, calcine the mixture in oxidizing atmosphere at the temperature range of 1100° to 1300° C. for about 2 hours, pulverize the calcined materials into a fine powder followed by adding a binder in solid or liquid form, in which the materials are not soluble, to bind the powder, and form the powder into disc shape in desired size with sufficient pressure for shaping, and then sinter the shaped materials in oxidizing atmosphere at the temperature range of 1100 to 1400° C. for about 3 hours.

FIGURE 1 of the accompanying drawings is a ternary diagram representing the relation between the three components of the ceramic bodies within the present invention, that is, barium titanate ($BaTiO_3$), lanthanum titanium oxide ($La_2O_3 \cdot 2TiO_2$) and calcium titanate ($CaTiO_3$) and the dielectric constant $\epsilon$.

Figure 1:
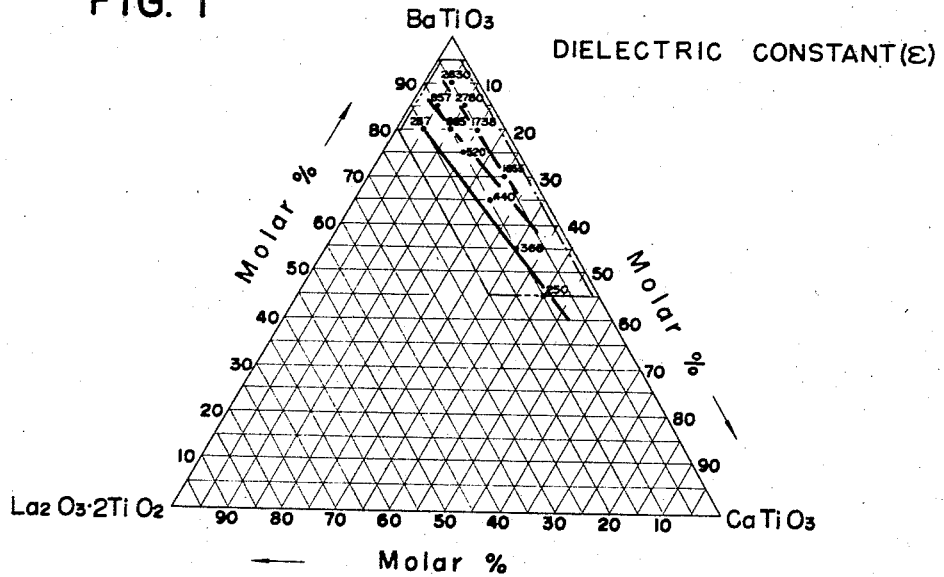
Figure 2:
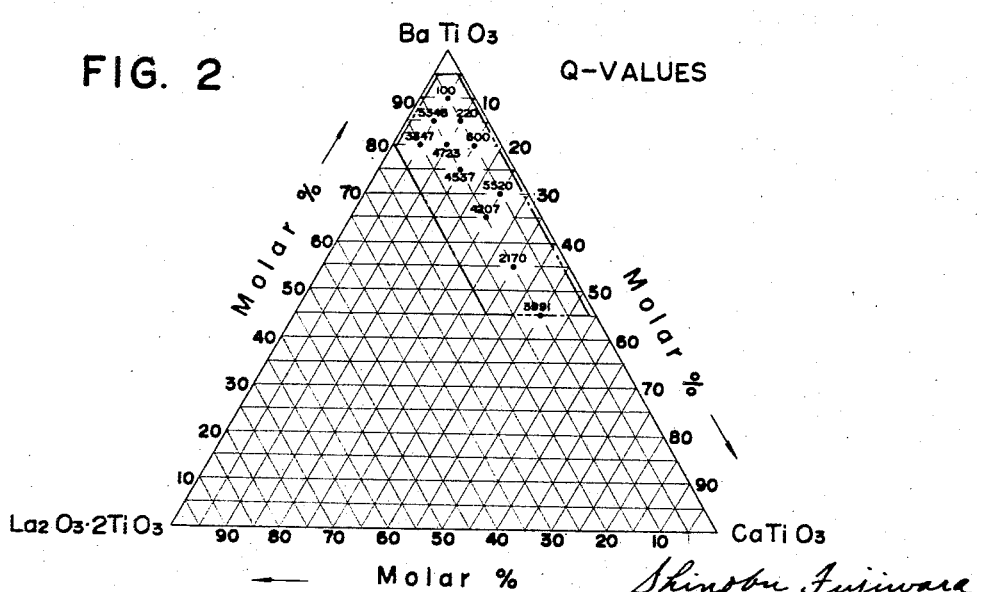
FIGURE 2 is a ternary diagram representing the relation between the three components of ceramic bodies within the present invention, that is, barium titanate ($BaTiO_3$), lanthanum titanium oxide ($La_2O_3 \cdot 2TiO_2$) and calcium titanate and the Q-value.
Figure 3:
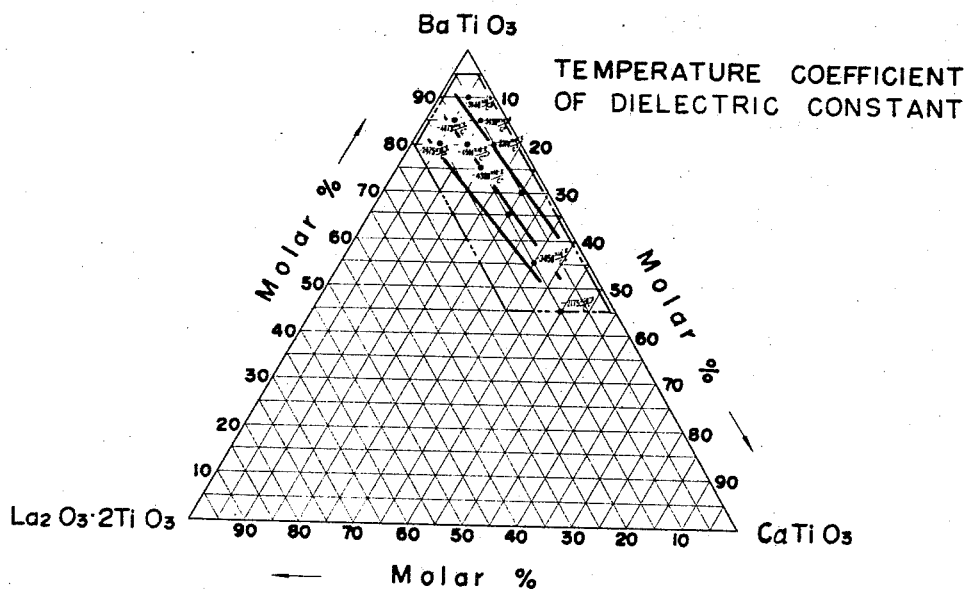
FIGURE 3 is a ternary diagram representing the relations between the three components of the ceramic bodies within the present invention, that is, barium titanate ($BaTiO_3$), lanthanum titanium oxide ($La_2O_3 \cdot 2TiO_2$) and calcium titanate ($CaTiO_3$) and temperature coefficient of the dielectric constant.

In the present invention, the range of the proportions of the three components, where the favorable properties of middle range of dielectric constant, low dielectric loss and good temperature coefficient can be obtained is limited, as can be seen in the diagrams, as follows:

(Molar percentage)
$BaTiO_3$ ---------------------------------- 45–95
$La_2O_3 \cdot 2TiO_2$ ------------------------------ 1–20
$CaTiO_3$ ---------------------------------- 1–54

The reasons for limiting the proportions to the said values are: When the proportion of barium titanate ($BaTiO_3$) is below 45 molar percent, dielectric constant $\epsilon$ becomes very small, and when it exceeds 95 molar percent, Q-value becomes extremely low. When the proportion of lanthanum titanium oxide ($La_2O_3 \cdot 2TiO_3$) is below 1 molar percent, the effect of addition is ineffective and when it exceeds 20 molar percent, vitrification is difficult. When the proportion of calcium titanate ($CaTiO_3$) is below 1 molar percent, the desired characteristics can not be obtained and when it exceeds 55 molar percent, dielectric constant $\epsilon$ becomes small.

The following examples will give a closer insight into the present invention.

EXAMPLE I

The raw materials employed are barium carbonate ($BaCO_3$), calcium carbonate ($CaCO_3$), lanthanum oxide ($La_2O_3$) and titanium oxide ($TiO_2$). In the present case, barium titanate ($BaTiO_3$) may be formed by reaction of a mixture of barium carbonate ($BaCO_3$) with titanium oxide ($TiO_3$) on firing, calcium titanate ($CaTiO_3$) may be formed by reaction of a mixture of calcium carbonate ($CaCO_3$) with titanium oxide ($TiO_2$) on firing, and lanthanum titanium oxide ($La_2O_3 \cdot 2TiO_2$) may be formed from lanthanum oxide ($La_2O_3$) and titanium oxide ($TiO_2$) on firing.

Mix barium carbonate ($BaCO_3$), calcium carbonate ($CaCO_3$) and lanthanum oxide ($La_2O_3$) with titanium oxide ($TiO_2$) in the following proportion:

$BaTiO_3 : La_2O_3 \cdot 2TiO_2 : CaTiO_3$
$= 55 : 10 : 35$ (molar percentage)

Stir the mixture of raw materials, to be homogeneous, for about 20 hours, then calcine the mixture in air at the temperature of 1260° C. for 2 hours. After calcination, pulverize the material so that the coarsest particles will pass a 250 mesh screen and the finest particles will not pass 300 mesh screen, and add a small quantity of starch solution in water. Then form the powder into a disc of desired shape of 15.2 mm. in diameter and 0.8 mm. in thickness under a pressure of 4 tons per square centimeter and then sinter at the temperature of 1350° F. for 3 hours.

The characteristics of ceramic dielectric thus obtained show following values:

Dielectric constant $\epsilon$ _____ 366.
Q-value _____ 2170.
Temperature coefficient of dielectric
  constant _____ $-3450 \times 10^{-6}/°$ C.

EXAMPLE II

The raw materials employed are barium carbonate ($BaCO_3$), calcium carbonate ($CaCO_3$), lanthanum oxide ($La_2O_3$) and titanium oxide ($TiO_2$). In the present case, barium titanate ($BaTiO_3$) may be formed by reaction of a mixture of barium carbonate ($BaCO_3$) with titanium oxide ($TiO_2$) on firing, calcium titanate ($SaTiO_3$) may be formed by reaction of a mixture of calcium carbonate ($CaCO_3$) with titanium oxide ($TiO_2$) on firing, and lanthanum titanium oxide ($La_2O_3 \cdot TiO_2$) may be formed from lanthanum oxide ($La_2O_3$) and titanium oxide ($TiO_2$) on firing.

Mix barium carbonate ($BaCO_3$), calcium carbonate ($CaCO_3$) and lanthanum oxide ($La_2O_3$) with titanium oxide ($TiO_2$) in the following proportion:

$BaTiO_3 : La_2O_3 \cdot 2TiO_2 : CaTiO_3$
        $= 45 : 10 : 45$ (molar percentage)

Stir the mixture of raw materials, to be homogeneous, for about 20 hours, then calcine the mixture in air at the temperature of 1240° C. for 2 hours. After calcination, pulverize the material so that the coarsest particles will pass a 250 mesh screen and the finest particles will not pass 300 mesh screen, and add a small quantity of starch solution in water. Then form the powder into a disc of desired shape of 15.2 mm. in diameter and 0.8 mm. in thickness under a pressure of 4 tons per square centimeter and then sinter finally at the temperature of 1350° C. for 3 hours.

The characteristics of ceramic dielectric thus obtained show following values:

Dielectric constant $\epsilon$ _____ 250.
Q-value _____ 3991.
Temperature coefficient of dielectric
  constant _____ $-2175 \times 10^{-6}/°$ C.

What is claimed is:
1. A ceramic dielectric consisting essentially of a sintered mixture of 45 to 95 molar percent of barium titanate ($BaTiO_3$), 1 to 20 molar percent of lanthanum titanium oxide ($La_2O_3 \cdot 2TiO_2$) and 1 to 54 molar percent of calcium titanate ($CaTiO_3$).
2. A ceramic dielectric according to claim 1 in which the proportion of barium titanate ($BaTiO_3$) is from 45 to 55 molar percent.
3. A ceramic dielectric according to claim 1 in which the proportion of lanthanum titanium oxide

$(La_2O_3 \cdot 2TiO_2)$ is about 10 molar percent.
4. A ceramic dielectric according to claim 1 in which the proportion of calcium titanate ($CaTO_3$) is from 35 to 45 molar percent.

References Cited

UNITED STATES PATENTS

| 3,292,062 | 12/1966 | Gallagher et al. | 106—39 |
| 2,420,692 | 5/1947 | Wainer | 106—39 |
| 2,985,700 | 5/1961 | Johnston | 106—39 |

FOREIGN PATENTS

| 574,577 | 1/1946 | Great Britain. |

OTHER REFERENCES

Kainz, "Dielectric Properties of the Systems Barium-Strontium-Lanthanum-Titanates," Ceramic Abstracts (1958), p. 277, item d., MacChesney et al., "The System $La_2O_3$-$TiO_2$; Phase Equilibria and Electrical Properties," J. Am. Ceramic Soc., September 1962, pp. 416–422.

MacChesney et al., "Stabilized Barium Titanate Ceramics for Capacitor Dielectrics," J. Am. Ceramic Society, May 21, 1963, pp. 197–202.

Kainz, Ber. deut. Keram. Ges., 35 [3], pp. 69–77 (1958).

Marzullo et al., Dielectric Properties of Titania or Tin Oxide Containing Varying Proportions of Rare Earth Oxides, J. Am. Ceramic Soc., vol. 41, January 1958, pp. 40–41.

HELEN M. McCARTHY, *Primary Examiner.*